United States Patent [19]
Brossier et al.

[11] Patent Number: 5,806,793
[45] Date of Patent: Sep. 15, 1998

[54] COOLING DEVICE FOR A TURBOSHAFT ENGINE ON AN AIRCRAFT

[75] Inventors: Pascal Noël Brossier, Lieusaint; Georges Mazeaud, Yerres; Jean-Marie Noël Pincemin, Crosne, all of France

[73] Assignee: Societe Nationale D'Etude Et De Construction De Moteurs D'Aviation "Snecma", Paris, France

[21] Appl. No.: 766,472

[22] Filed: Dec. 12, 1996

[30] Foreign Application Priority Data

Dec. 13, 1995 [FR] France .................................. 95 14749

[51] Int. Cl.⁶ ............................ B64D 33/10; B64C 21/06
[52] U.S. Cl. ......................... 244/57; 244/117 A; 244/209
[58] Field of Search .................................. 244/53 B, 57, 244/130, 209, 117 A

[56] References Cited

U.S. PATENT DOCUMENTS

| | | | |
|---|---|---|---|
| 3,510,095 | 5/1970 | Chuan | 244/130 |
| 4,203,566 | 5/1980 | Lord | 244/57 |
| 4,504,030 | 3/1985 | Kniat et al. | 244/57 |
| 4,778,130 | 10/1988 | Kim | 244/57 |
| 5,297,765 | 3/1994 | Hughes et al. | 244/209 |
| 5,618,363 | 4/1997 | Mullender et al. | 244/130 |

FOREIGN PATENT DOCUMENTS

| | | |
|---|---|---|
| 0 298 011 | 1/1989 | European Pat. Off. |
| 2 666 064 | 2/1992 | France |
| WO 92/11451 | 7/1992 | WIPO |

*Primary Examiner*—Virna Lissi Mojica
*Attorney, Agent, or Firm*—Oblon, Spivak, McClelland, Maier & Neustadt, P.C.

[57] ABSTRACT

A cooling device for an aircraft turboshaft engine includes a boundary layer suction device formed by a perforated external wall portion of the aircraft, a collector on the inside of the wall portion for receiving the air flowing in through the perforations, and a discharge device discharging the air from the collector. The cooling device is completed by a heat exchanger which is disposed in the path of the air flow through the collector, a pump for pumping fluid to be cooled through the heat exchanger from a circuit of the engine, and a regulator regulating the fluid flow through the exchanger to control the temperature of the fluid. The fluid which is cooled may be from the lubrication circuit, the fuel circuit, or an air circuit of the engine, and the boundary layer suction device is preferably disposed in the pod of the engine.

10 Claims, 1 Drawing Sheet

COOLING DEVICE FOR A TURBOSHAFT ENGINE ON AN AIRCRAFT

BACKGROUND OF THE INVENTION

1. Field of the Invention

The invention relates to a cooling device for a turboshaft engine on an aircraft, and more specifically, but not exclusively, for the high-power bypass turbojet engines used in civil aviation.

2. Summary of the Prior Art

Turboshaft engines dissipate heat especially at the lubricated members such as the bearings, the equipment support known also as the gearbox, as well as in the transmission from the rotor to the equipment support. The temperatures of these components as well as that of the lubricant are stabilized thanks to the circulation of lubricant between these components and heat exchangers which exchange heat with the engine fuel circuit or heat exchangers which exchange heat with the exterior air, especially in the cold bypass duct.

This dissipation of heat becomes very substantial in large highpower turboshaft engines, and is further increased in turboshaft engines which include mechanical reduction gearing transmitting the power of the turbine to the propulsion stage.

A first problem is that the available fuel flow rate is no longer sufficient to cool the lubricant owing to the improvement in efficiency of such engines.

A second problem is that the air/oil heat exchangers needed to cool the lubricant and make up for the insufficiency of fuel flow rate are large and create drag which penalizes engine performance.

A third problem is the need to control the internal temperature of the engine to keep it within temperature ranges which are optimum for good use of the lubricant and of the fuel, and for control of the expansion clearances between the stationary and moving parts of the engine. This control is provided by means of well-known regulating devices capable of acting on each of the fluids circulating within the engine, namely lubricant, fuel and air, but the effectiveness of these devices depends on the ability of the cooling circuits to discharge the excess heat.

French patent 2666064 and U.S. Pat. No. 5114103 disclose a device for supplying compressed air and cooling air which involves a suction circuit for drawing air from the boundary layer of the engine pod and conveying it to the environment-control system of the aircraft, thus avoiding having to draw off and cool air from the engine compressor. Such a device does not solve the problem posed, because the amount of cold air that can be supplied is not enough to provide the envisaged cooling.

SUMMARY OF THE INVENTION

In order to solve the problem of cooling aircraft turboshaft engines including at least one circuit for the flow of fluid, the invention proposes a cooling device which is arranged to cool said fluid and which comprises:

a) a wall portion of said aircraft exposed to an external air flow forming a boundary layer adjacent said wall portion, a plurality of perforations through said wall portion for the intake of air from said boundary layer, a collector for the air taken in through said perforations, and means for discharging said air from said collector, said wall portion, said perforations, said collector and said discharge means constituting a boundary layer suction device;

b) at least one heat exchanger disposed in said collector in the path of the flow of air through said collector;

c) means connecting said heat exchanger to said internal fluid circuit of said engine;

d) means for pumping the fluid to be cooled from said internal fluid circuit through said heat exchanger; and, e) means for regulating the temperature of said fluid.

The temperature regulating means preferably comprises means for regulating the circulation of the fluid between the exchanger and the fluid circuit of the engine as a function of the temperature drop to be obtained.

In one embodiment, the heat exchanger is arranged so that the air flow through the collector passes through the exchanger.

In an alternative embodiment, the heat exchanger may be arranged to be tangential to the air flow so that it is swept by the air flow. In this case the heat exchanger may comprise a plurality of pipes arranged against the wall of the air collector, the wall offering a large surface area in contact with the air flow and thus acting as a radiator.

The boundary layer suction device may be in the fuselage or in the wings of the aircraft. However, in a preferred embodiment, the boundary layer suction device is disposed in the pod surrounding the turboshaft engine, so as to minimize the length of the connections between the heat exchanger and the fluid circuit of the engine and hence also the power requirement for the pumping means and the penalty on engine efficiency.

The heat exchanger may be connected to the engine oil circuit, thereby providing effective cooling of the lubricant and of the lubricated moving parts, or it may be connected to the fuel circuit of the engine or to the air circuit for controlling the rotor clearances.

Indeed, the cooling device may be provided with separate heat exchangers for any two, or even all three, of these engine fluid circuits.

Preferably, the discharge means includes at least one pipe leading from the air collector within which is arranged a nozzle pointing downstream in the direction of the air flow through the pipe, the nozzle being connected to the engine compressor by a conduit which can be closed off by a control means. Thus when the speed of the aircraft is too low to produce sufficient air flow through the collector, the nozzle is activated to blow air drawn off from the compressor and thereby create a suction effect which draws airs through the collector.

It will be appreciated that the invention exploits the substantial flow of cold, but low-pressure air drawn from the boundary layer and passing through the collector. The substantial size of the collector allows the use of a large exchanger with wide air passages which cause only a negligible drop in pressure of the air flow in comparison with the drop in pressure of the air through the multiple perforations of the wall in contact with the boundary layer. The cooling device in accordance with the invention therefore allows a large amount of heat to be discharged without causing drag.

Boundary layer suction devices generally provide only a limited gain in performance and are not considered particularly attractive by some people bearing in mind the increase in weight of the aircraft and the costs which they entail. The invention has the advantage of providing an additional gain in performance by reducing or eliminating the drag caused by using conventional air/fluid heat exchangers. As a consequence, the combination of a boundary layer suction device and at least one heat exchanger in accordance with the invention increases the attraction of boundary layer suction devices.

Another advantage of the invention is that the heat exchanger is perfectly protected by the multi-perforated wall against impact by foreign bodies, which makes it possible to reduce the robustness and mass of the exchanger.

Yet another advantage of the invention is that it frees the space immediately around the engine by shifting the heat exchanger into the collector of the boundary layer suction device. Arranging the heat exchanger and the collector between the twin walls of the engine pod makes it possible to use a volume which is normally unoccupied but is close to the engine, thereby minimizing the length of the connections between the heat exchanger and the engine.

The present invention cannot be likened to a new use of the device disclosed in French patent 2666064. This is because, in this patent, the cold air is conveyed to the user members by pipes. Despite the overpressure obtained by the pumping means, the air flow through these pipes remains limited and insufficient to cool large turboshaft engines, whereas the present invention makes best use of the substantial flow of cold air behind the perforations in the wall. It will also be noted that in the device of the abovementioned patent the pumping means heats up the air, thus increasing its pressure, whereas in the present invention the drop in pressure in the collector, resulting from the pressure drop on passage of the air through the perforations, cools this air and improves the efficiency of the heat exchange. Also the invention allows the use of large-sized heat exchangers, and in one particular embodiment makes use of space available between the walls of the engine pod.

DESCRIPTION OF THE PREFERRED EMBODIMENT

Figure 1:
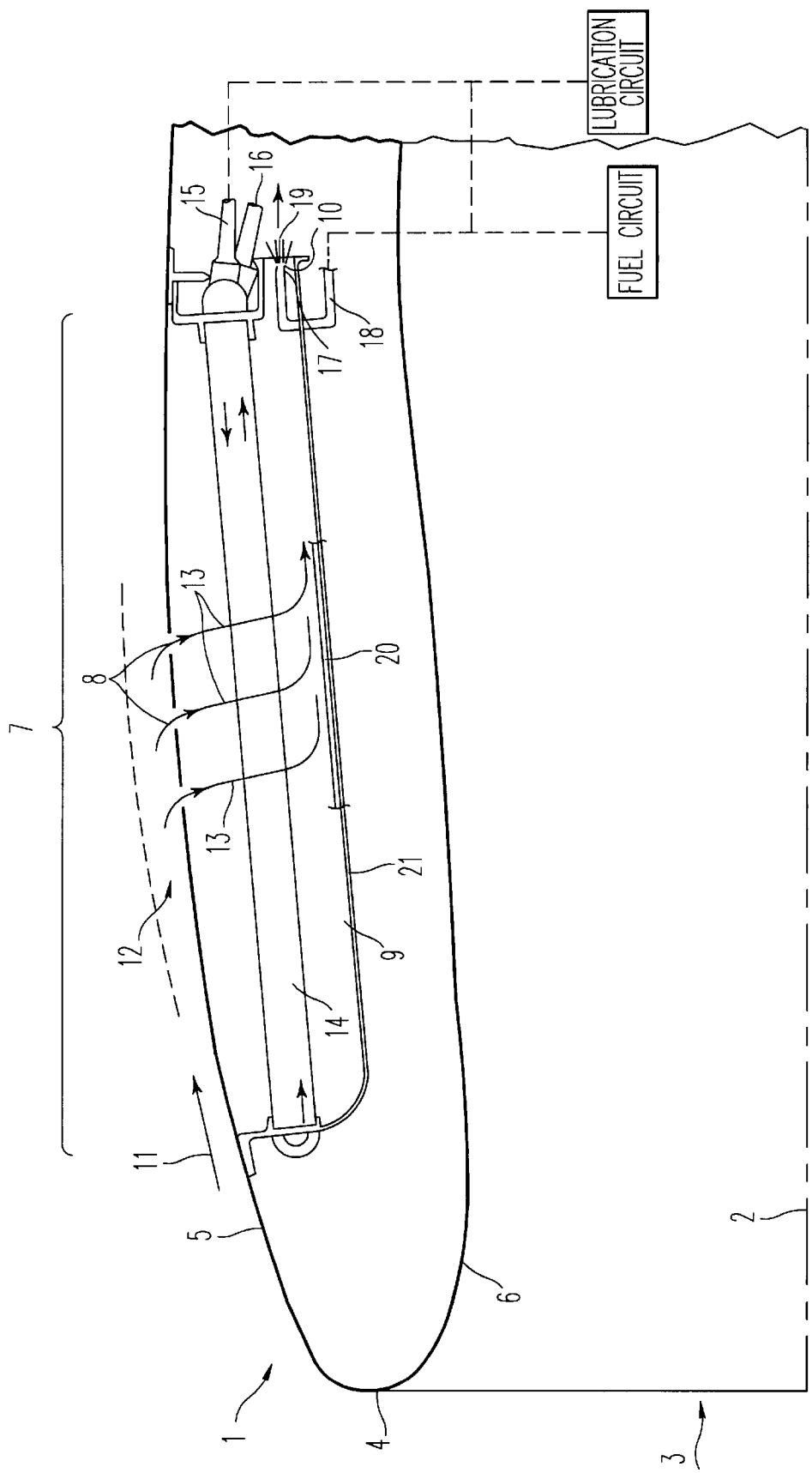
FIG. 1 shows a half-axial section through the front part of the pod surrounding a turbojet engine and fitted with one embodiment of the cooling device in accordance with this invention.

The engine pod 1 shown in the drawing is approximately circular about the geometric axis 2 of the turbojet engine (not shown) which it houses. The pod 1 defines at the front an air intake 3 delimited by the leading edge 4, and has an outer annular wall 5 which starts from the leading edge 4 and an inner annular wall 6 which also starts from the leading edge 4. Normally, the space between the walls 5 and 6 is unoccupied. The outer wall 5 includes, rearwardly of the leading edge 4, a region 7 in which the wall is pierced by a plurality of holes 8 opening into a closed box structure forming a collector 9 and preferably extending inwardly and rearwardly to discharge pipes 10.

The flow of external air 11 outside the pod 1 is greatly slowed down in a region 12 known as the boundary layer close to the outer wall 5, and the flow of air 11 become turbulent when the velocity gradient increases, which has the effect of increasing the drag on the pod and therefore of slowing the aircraft down. The turbulent flow is eliminated by sucking air 13 from the boundary layer 12 through the holes 8, this air 13 traveling through the collector 9 before being discharged through the pipes 10. Between the holes 8 and the pipes 10, that is to say in the path of the flow of air 13, is arranged a heat exchanger 14 connected to the lubrication circuit of the turbojet engine by a duct 15 for conveying hot lubricant to the exchanger 14 and by a duct 16 for returning the cooled lubricant to the circuit.

In order to maintain the effectiveness of the heat exchanger 14 at low aircraft speeds, nozzles 17 connected by a closeable conduit 18 to the compressor of the turbojet engine are arranged in the discharge pipes 10. The nozzles 17 point in the direction of the flow of the air 13 through the pipes 10, and when the conduit 18 is open air 19 under pressure is drawn off from the compressor and is ejected from the nozzles 17. This creates a suction in the pipes 10 which sustains the cool air flow 13. It will be noted that this air 19 is hot because it has been subjected to adiabatic compression, and the nozzles 17 will therefore preferably be arranged downstream of the heat exchanger 14.

The tap-off duct 15 carrying fluid to the exchanger 14 emerges from one or more hot points of the lubrication circuit downstream of the bearings or equipment support, and the return duct 16 feeds back into the circuit at some other point which depends on the particular design of the circuit. A closeable bypass duct (not shown) also connects the ducts 15 and 16 so that the amount of fluid passing through the heat exchanger 14 can be adjusted as a function of the temperature drop to be obtained.

The heat exchanger 14 may take various forms, for example a plate disposed in the upper part of the pod 1 or, in contrast, a ring extending completely around the pod. In the latter case its ability to discharge the heat becomes very great.

The heat exchanger 14 may be a single exchanger and may act, for example, on the lubricant circuit as described above.

Alternatively, it may act on a different fluid circuit of the engine. The exchanger 14 may also comprise several separate exchangers 14, 114 each being arranged to act on a different engine fluid circuit, e.g. lubricant, fuel or air.

The heat exchanger 14 preferably has the air flow 13 passing through it as illustrated in the drawing. However, it may instead be tangential to the air flow 13 so that it is swept by the air. For example the exchanger may then be in the form of pipes 20 pressed against the wall 21 of the collector 9, which then fulfills the additional function of a radiator.

We claim:

1. A cooling device for an aircraft turboshaft engine including at least one internal circuit for the flow of a fluid, said cooling device being arranged to cool said fluid and comprising:

a) a wall portion of said aircraft exposed to an external air flow forming a boundary layer adjacent said wall portion, a plurality of perforations through said wall portion for the intake of air from said boundary layer, a collector for the air taken in through said perforations, and a discharge device for discharging said air from said collector, said wall portion, and said perforations, said collector and said discharge device comprising a boundary layer suction device;

b) at least one heat exchanger disposed in said collector in the path of the flow of air through said collector;

c) a connector connecting said heat exchanger to said internal fluid circuit of said engine;

d) a pump pumping the fluid to be cooled from said internal fluid circuit through said heat exchanger; and e) a regulator regulating the temperature of said fluid.

2. A cooling device as claimed in claim 1, wherein said heat exchanger is disposed so that said flow of air through said collector passes through said heat exchanger.

3. A cooling device as claimed in claim 1, wherein said heat exchanger is disposed so that said flow of air through said collector is tangential to said heat exchanger.

4. A cooling device as claimed in claim 3, wherein said heat exchanger comprises at least one pipe mounted against the wall of said collector.

5. A cooling device as claimed in claim 1, wherein said at least one heat exchanger comprises a an elemental exchanger acting on each of different fluids of said engine.

6. A cooling device as claimed in claim 1, wherein said boundary layer suction device is disposed in the pod surrounding said engine, so as to minimize the length of said connector and the power requirement of said pump.

7. A cooling device as claimed in claim 1, wherein said at least one heat exchanger is connected to the lubrication circuit of said engine.

8. A cooling device as claimed in claim 1, wherein said at least one heat exchanger is connected to the circuit of said engine.

9. A cooling device as claimed in claim 1, wherein said discharge device comprises at least one pipe leading from said air collector and, in order to maintain said flow of air through said collector at low aircraft speeds, a nozzle disposed in said pipe so as to point downstream in the direction of the flow of air through said pipe, and a closeable conduit connecting said nozzle to the compressor of said engine.

10. A cooling device as claimed in claim 6, wherein said collector and said heat exchanger extend completely around the pod.

* * * * *

UNITED STATES PATENT AND TRADEMARK OFFICE
CERTIFICATE OF CORRECTION

PATENT NO. : 5,806,793
DATED : September 15, 1998
INVENTOR(S) : Pascal Noel BROSSIER et al It is certified that error appears in the above-identified patent and that said Letters Patent is hereby corrected as shown below:

Column 2, line 44, change "airs" to --air--.

Column 4, line 4, change "open" to --open,--.

Column 5, line 2, after "comprised", delete "a".

Signed and Sealed this

Twenty-seventh Day of April, 1999

Attest:

Q. TODD DICKINSON

Attesting Officer

Acting Commissioner of Patents and Trademarks